(12) United States Patent
Krenkel

(10) Patent No.: US 7,753,008 B2
(45) Date of Patent: Jul. 13, 2010

(54) HARNESS FOR A PET DIAPER

(76) Inventor: Dorice Marie Krenkel, 6541 Beechwood Ave., Portage, IN (US) 46368

( * ) Notice: Subject to any disclaimer, the term of this patent is extended or adjusted under 35 U.S.C. 154(b) by 712 days.

(21) Appl. No.: 11/623,881

(22) Filed: Jan. 17, 2007

(65) Prior Publication Data

US 2007/0163520 A1  Jul. 19, 2007

Related U.S. Application Data

(60) Provisional application No. 60/758,931, filed on Jan. 17, 2006.

(51) Int. Cl.
*A01K 23/00* (2006.01)
*A01K 29/00* (2006.01)
(52) U.S. Cl. ........................ 119/869; 119/868
(58) Field of Classification Search ................ 119/869, 119/850, 856, 868, 863, 865, 792; D30/144
See application file for complete search history.

(56) References Cited

U.S. PATENT DOCUMENTS

| 4,290,386 | A | * | 9/1981 | Eiriksson | 119/868 |
|---|---|---|---|---|---|
| 4,559,906 | A | * | 12/1985 | Smith | 119/865 |
| 4,969,419 | A | | 11/1990 | Fong | |
| D334,252 | S | * | 3/1993 | Stubbs | D30/144 |
| 5,199,383 | A | * | 4/1993 | Lagana | 119/858 |
| 5,386,801 | A | * | 2/1995 | Chinn et al. | 119/868 |
| 5,555,847 | A | | 9/1996 | Kelly | |
| 5,662,640 | A | | 9/1997 | Daniels | |
| 5,813,369 | A | | 9/1998 | Fujinaga | |
| 6,142,105 | A | | 11/2000 | McKnight | |
| 6,368,313 | B1 | | 4/2002 | Howard | |
| 6,394,041 | B1 | | 5/2002 | Katz | |
| 6,557,497 | B1 | * | 5/2003 | Milligan | 119/850 |
| 6,675,745 | B1 | | 1/2004 | Brewington | |
| 6,895,901 | B1 | * | 5/2005 | Howard | 119/869 |
| 7,044,087 | B1 | * | 5/2006 | Brecheen | 119/868 |
| 2005/0263105 | A1 | * | 12/2005 | Moharram | 119/850 |
| 2006/0096551 | A1 | | 5/2006 | Brewington | |
| 2006/0149203 | A1 | | 7/2006 | Draper et al. | |
| 2006/0196447 | A1 | | 9/2006 | Poh-Beyerlein et al. | |
| 2007/0012263 | A1 | * | 1/2007 | Hammonds | 119/850 |

* cited by examiner

*Primary Examiner*—Yvonne R. Abbott
(74) *Attorney, Agent, or Firm*—Hartman & Hartman, PC; Gary M. Hartman; Domenica N S Hartman

(57) ABSTRACT

A harness suitable for comfortably securing a diaper to a four-legged pet, such as a dog or cat. The harness includes first and second strap members, each having first and second ends. The first and second strap members form a first intersection located in proximity to the first ends of the first and second strap members, and a second intersection located in closer proximity to the second ends of the first and second strap members than the first intersection. The first strap member defines a loop between the first and second intersections that is sized and configured to cross the chest of an animal. The first and second ends of the first strap member are equipped with features for securing a diaper to the first strap member. The second strap member is equipped with features for forming an adjustable loop with the second strap member.

20 Claims, 1 Drawing Sheet

HARNESS FOR A PET DIAPER

This application claims the benefit of U.S. Provisional Application No. 60/758,931, filed Jan. 17, 2006, the contents of which are incorporated herein by reference.

BACKGROUND OF THE INVENTION

The present invention generally relates to apparatuses and methods for containing the excrement of pets. More particularly, this invention relates to a harness for a pet diaper that can be customized to the size of the particular pet using interconnected straps, at least one of which is attached to a disposable diaper, to provide a secure and comfortable fit for the pet while effectively maintaining the hygiene of the pet and its environment.

Diapers are at times desired or necessary for pets. For example, a diaper may be necessary due to the age of the pet, a physical handicap of the pet, or when a female pet is in "heat." In addition, a diaper may be desired if a pet is left alone for an extended period of time or to provide a barrier to prevent pregnancy of the pet.

Harnesses for securing pet diapers have been proposed in the past, as evidenced by U.S. Pat. No. 6,675,745 to Brewington. Harnesses of the type taught by Brewington are adapted to be secured around the legs and neck of the body of the pet. Although these harnesses may secure the diaper, they are not necessarily comfortable for the pet, nor are they particularly adept at accommodating both the length and girth of the pet. If the pet is not comfortable with the harness, the pet will tend to work at removing the harness or diaper from its body. This may compromise the integrity of the diaper, as well as be an annoyance to the pet's general demeanor.

In view of the above, it would be desirable if an improved harness were available that avoided the disadvantages of prior art equipment and methods for securing pet diapers, and in particular provided a comfortable and customizable means for securing diapers to pets of various sizes.

BRIEF SUMMARY OF THE INVENTION

The present invention provides a harness suitable for comfortably securing a diaper to a legged animal, including dogs and cats. The harness generally includes first and second strap members, each having first and second ends. The first and second strap members form a first intersection located in proximity to the first ends of the first and second strap members, and a second intersection located in closer proximity to the second ends of the first and second strap members than the first intersection. The first strap member defines a loop between the first and second intersections that is sized and configured to cross the chest of an animal. The first and second ends of the first strap member are equipped with features for securing a diaper to the first strap member. The second strap member is equipped with features for forming an adjustable loop with the second strap member, which can be sized and configured to wrap around the girth of the animal.

According to preferred aspects of the invention, the lengths of the strap members can be modified so as to accommodate pets of different lengths and girths, and the harness is comfortably positioned on the pet so as to provide tension in the direction along the length of the pet's body without unduly pulling against its neck or under its legs. Since the strap members cooperate in tandem to secure the diaper on the pet's body, there is no pulling or tugging at a particular region of the pet's body. This aspect of the invention significantly increases the pet's acceptance of the diaper.

Other objects and advantages of this invention will be better appreciated from the following detailed description.

DETAILED DESCRIPTION OF THE INVENTION

Figure 1:
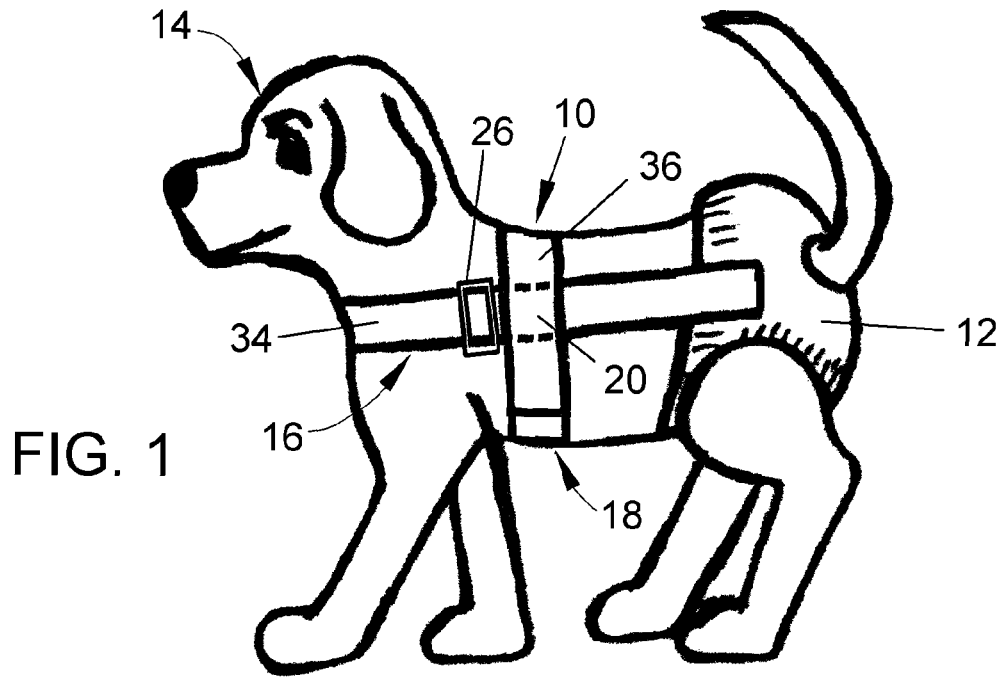
FIG. 1 is a side view of a pet wearing a diaper secured by a diaper harness in accordance with an embodiment of this invention.
Figure 2:
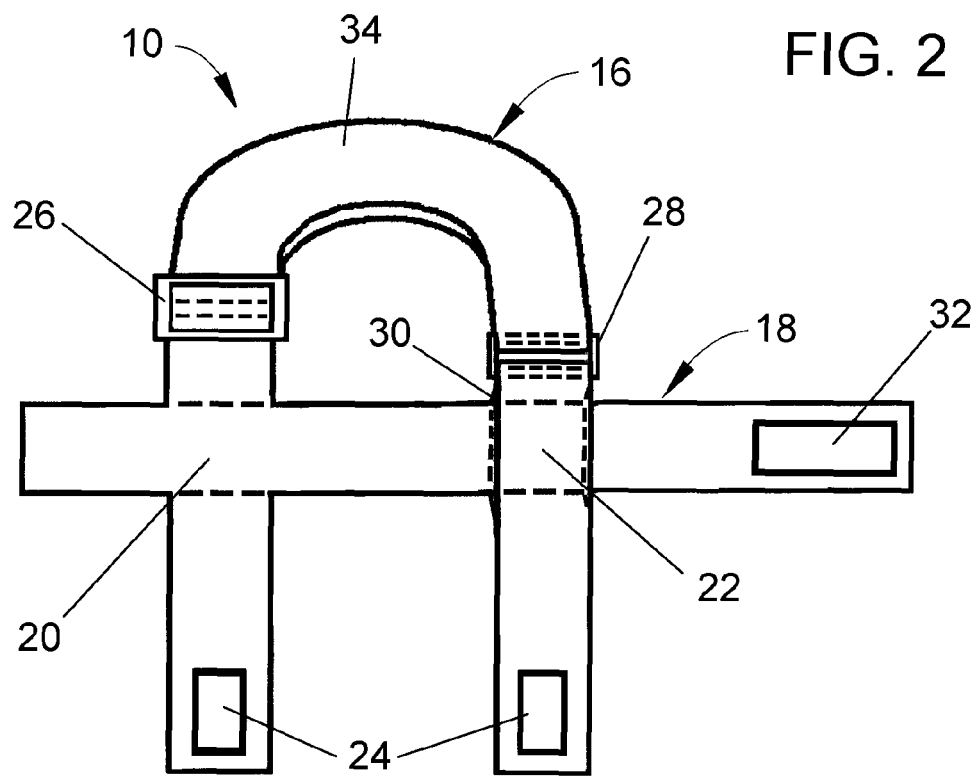
FIG. 2 represents a plan view of the diaper harness of FIG. 1 removed from the pet and detached from the diaper.

As illustrated in FIGS. 1 and 2, the present invention provides a harness 10 suitable for comfortably securing a diaper 12 to a legged animal, such as the dog 14 shown in FIG. 1, as well as other legged animals and particularly four-legged animals, including cats, etc. FIG. 1 depicts the dog 14 as being fitted with the harness 10 of this invention so as to comfortably secure the diaper 12 (preferably a disposable diaper) to its body.

As shown in FIG. 1 and more readily seen in FIG. 2, the harness 10 includes interconnected straps 16 and 18, a first of which will be referred to as a harness strap 16 and a second of which will be referred to as a securing strap 18. Each of the straps 16 and 18 may be formed from a single piece of material or formed in segments that can be permanently or adjustably connected, as will be evident from the following description. Suitable materials for the straps 16 and 18 include moisture and wear-resistant materials such as polyester, though a wide variety of other materials could be used. The straps 16 and 18 preferably intersect and are connected to each other at least one of two intersections 20 and 22, at which the straps 16 and 18 are roughly perpendicular to each other. For example, one or both intersections 20 and 22 can be formed by forming both straps 16 and 18 from a single piece of material, or by permanently joining the straps 16 and 18 such as by stitching, bonding, etc., or by releasably joining the straps 16 and 18 such as with fasteners including snaps, buckles, hook-and-loop fasteners (e.g., VELCRO®), etc., or by adjustably joining the straps 16 and 18 such as with a buckle or by forming one of the straps 16 and 18 to have a slot through which the other strap is inserted. In FIGS. 1 and 2, the intersection 20 is represented as being fixed as a result of being formed by stitching the straps 16 and 18 together, while the second intersection 22 is adjustable as a result of being formed by the securing strap 18 being inserted through a slot 30 formed in the harness strap 16.

As shown in FIG. 2, the harness strap 16 is generally the longer of the two straps 16 and 18, though the invention is not limited by the relative lengths of the straps 16 and 18. Two ends of the harness strap 16 are adapted to be attached to the disposable diaper 12, as shown in FIG. 1. The ends of the harness strap 16 are shown as having fasteners 24, such as hook-and-loop (e.g., VELCRO®) fasteners, attached to an interior surface 26 of the strap 16 near its ends. Hook-and-loop fasteners are preferred as the fastener 24 because of their ability to securely attach to complementary fastening surfaces typically present on commercially-available disposable diapers.

The length of the section of the harness strap 16 between the intersections 20 and 22 with the securing strap 18 is preferably adjustable to enable the harness 10 to be fitted onto pets of various sizes. For this purpose, the strap 16 is shown as having two sections, one of which forms the left leg of the harness 10 (as viewed in FIG. 2), is secured to the securing strap 18 at the fixed intersection 20, passes through an adjustment buckle 26 adjacent the fixed intersection 20, extends to and doubles back on a second buckle 28 adjacent the adjustable intersection 22, and returns to the adjustment buckle 26 where it is secured. The second section of the harness strap 16 is attached at one end to the second buckle 28, forms the slot 30 through which the securing strap 18 is received to form the adjustable intersection 22, and continues through the adjustable intersection 22 to form the right leg of the harness 10 (as viewed in FIG. 2). In this manner, the harness strap 16 forms a loop 34 with the securing strap 18 between the two intersections 20 and 22.

As evident from FIG. 1, the harness 10 is installed so that the harness strap 16 is looped around the front of the dog's chest (and therefore below its neck and above its front legs) and the ends of the strap 16 extend rearward to the diaper 12. The length of the harness strap 16 can be modified with the buckles 26 and 28 to accommodate the body length of the dog 14, as well as the width of its chest. The harness strap 16 is particularly comfortable for the dog 14 since the strap 16 draws tension against the pet's chest and pulls in a natural direction along the length of the pet's body without unduly pulling against the pet's neck or under its legs.

A seen from FIG. 1, the securing strap 18 is attached to the harness strap 16 and configured to form an adjustable loop 36 oriented to lie in a plane roughly perpendicular to a plane defined by the harness strap 16 when the harness 10 is properly worn by the dog 14. The loop 36 formed by the securing strap 18 encircles the dog 14 around its girth behind its front legs. One end of the securing strap 18 is equipped with a fastener 32, such as a hook-and-loop fastener, to enable the end of the strap 18 to be secured to another region of the strap 18 and enable adjustment of the fit of the securing strap 18 around the dog 14 to accommodate different girths. The securing strap 18, like the harness strap 16, does not particularly annoy the dog 14 or restrict its movement since the strap 18 is located generally around the midsection of the dog 14 and therefore does not pull against the neck or limbs of the dog 14.

As evident from the above, the interconnected harness and securing straps 16 and 18 cooperate in tandem to secure the diaper 12 on the pet's body, and avoid undue pulling or tugging at a particular region of the pet's body when the dog 14 moves. This aspect of the invention significantly increases the pet's acceptance of the harness 10 and the diaper 12.

The harness 10 can be secured to the dog 14 by being placed flat on a surface, generally as represented in FIG. 2. The dog's front paws are then placed through the loop 34 formed by the harness strap 16, and the harness 10 is drawn up toward the chest of the dog 14. The securing strap 18 can then be wrapped around the dog's chest and secured to itself with the fastener 32, forming the second loop 36 with the securing strap 18. The loop 34 formed by the harness strap 16 can then be adjusted with the buckle 26 to create a snug but comfortable fit across the dog's chest. The diaper 12 can then be placed on the dog 14 and secured with the fasteners 24 at the ends of the harness strap 16.

While the invention has been described in terms of a preferred embodiment, it is apparent that other forms could be adopted by one skilled in the art. For example, the physical configuration of the harness 10 and the number, lengths, and configurations of the straps 16 and 18 could differ from that shown, and materials and procedures other than those noted could be use. Therefore, the scope of the invention is to be limited only by the following claims.

The invention claimed is:

1. An animal diaper harness comprising:
   a first strap member comprising at least two sections, a first section forming a first end of the first strap member and a second section being coupled to the first section and forming a second end of the first strap member;
   a second strap member having first and second ends;
   a first intersection formed by a connection between the second strap member and the first section of the first strap member, the first intersection being located in proximity to the first ends of the first and second strap members;
   a second intersection formed by a connection the second strap member and the second section of the first strap member, the second intersection being located in closer proximity to the second ends of the first and second strap members than the first intersection;
   a loop defined by the first and second sections of the first strap member between the first and second intersections, the loop having an adjustable length and being configured to cross the chest of an animal;
   means for securing the first and second ends of the first strap member to a diaper; and
   means for fastening portions of the second strap member together to form an adjustable loop with the second strap member;
   wherein the harness does not comprise straps in addition to the first and second strap members, and wherein at least one of the first and second intersections is adjustable so that the connection thereof permits relative movement between the first and second strap members.

2. The animal diaper harness according to claim 1, wherein the first and second strap members are perpendicular to each other at the first and second intersections.

3. The animal diaper harness according to claim 1, wherein one of the first and second intersections is non-adjustable so that the connection thereof does not permit relative movement between the first and second strap members.

4. The animal diaper harness according to claim 1, wherein the harness does not comprise straps in addition to the second strap member and the first and second sections of the first strap member.

5. The animal diaper harness according to claim 1, wherein the first and second ends of the first strap member are free and not interconnected to each other by any portion of the harness.

6. The animal diaper harness according to claim 1, wherein the at least one of the first and second intersections is adjustable and permits relative movement between the first and second strap members as a result of the second strap member passing through a slot in the first strap member at one of the first and second intersections.

7. The animal diaper harness according to claim 1, wherein the first and second strap members are non-adjustably joined to each other at the first intersection and adjustably joined to each other at the second intersection.

8. The animal diaper harness according to claim 1, further comprising a diaper secured by the securing means to the first and second ends of the first strap member.

9. The animal diaper harness according to claim 1, wherein the securing means comprises releasable fasteners.

10. The animal diaper harness according to claim 9, wherein the releasable fasteners are hook-and-loop fasteners.

11. The animal diaper harness according to claim 1, wherein the fastening means comprises a releasable fastener at at least one of the first and second ends of the second strap member.

12. The animal diaper harness according to claim 1, wherein the loop defined by the first strap member comprises a first buckle attached to the first section of the first strap member adjacent the first intersection, a second buckle that joins the first and second strap members together adjacent the second intersection, and a portion of the first section of the first strap member that passes through the first buckle, extends to and doubles back on the second buckle, and returns to the first buckle where it is secured.

13. An animal diaper harness comprising:
- a first strap member comprising at least two sections, a first section forming a first end of the first strap member and a second section being coupled to the first section and forming a second end of the first strap member;
- a second strap member having first and second ends;
- a first intersection defined by a connection between the first section of the first strap member and the second strap member, the first intersection being located in proximity to the first ends of the first and second strap members such that the first ends of the first and second strap members extend from the first intersection, the first and second strap members being approximately perpendicular to each other at the first intersection;
- a second intersection defined by a connection between the second section of the first strap member and the second strap member, the second intersection being located in closer proximity to the second ends of the first and second strap members than the first intersection, the second ends of the first and second strap members extending from the second intersection;
- an adjustable loop defined by the first and second sections of the first strap member between the first and second intersections, the adjustable loop having an adjustable length and being configured to cross the chest of an animal;
- means for securing the first and second ends of the first strap member to a diaper; and
- means for fastening portions of the second strap member together to form an adjustable loop with the second strap member;

wherein the second intersection is adjustable so that the connection thereof permits relative movement between the first and second strap members, and the first intersection is non-adjustable so that the connection thereof does not permit relative movement between the first and second strap members.

14. The animal diaper harness according to claim 13, wherein the harness does not comprise straps in addition to the second strap member and the first and second sections of the first strap member.

15. The animal diaper harness according to claim 13, wherein the first and second ends of the first strap member are free and not interconnected to each other by any portion of the harness.

16. The animal diaper harness according to claim 13, wherein the second intersection is adjustable and permits relative movement between the first and second strap members as a result of the second strap member passing through a slot in the first strap member at the second intersection.

17. The animal diaper harness according to claim 13, wherein the loop defined by the first strap member comprises a first buckle attached to the first section of the first strap member adjacent the first intersection, a second buckle that joins the first and second strap members together adjacent the second intersection, and a portion of the first section of the first strap member that passes through the first buckle, extends to and doubles back on the second buckle, and returns to the first buckle wherein it is secure.

18. The animal diaper harness according to claim 13, wherein the securing means comprises releasable fasteners.

19. The animal diaper harness according to claim 18, wherein the releasable fasteners are hook-and-loop fasteners.

20. The animal diaper harness according to claim 13, wherein the fastening means comprises a releasable fastener at at least one of the first and second ends of the second strap member.

* * * * *